United States Patent [19]

Gottlieb et al.

[11] Patent Number: 4,653,869
[45] Date of Patent: Mar. 31, 1987

[54] ACOUSTO-OPTIC DISPERSIVE LIGHT FILTER

[75] Inventors: Milton Gottlieb, Churchill Boro, Pa.; Fredrick L. Schaff, Ellicott City, Md.

[73] Assignee: Westinghouse Electric Corp., Pittsburgh, Pa.

[21] Appl. No.: 785,643

[22] Filed: Oct. 7, 1985

Related U.S. Application Data

[62] Division of Ser. No. 666,416, Oct. 30, 1984.

[51] Int. Cl.$^4$ .................................................. G02F 1/11
[52] U.S. Cl. ...................................... 350/372; 350/401; 350/358
[58] Field of Search ................. 350/371, 372, 401, 358

[56] References Cited

U.S. PATENT DOCUMENTS

| | | | |
|---|---|---|---|
| 3,944,334 | 3/1976 | Yano et al. | 350/372 |
| 4,052,121 | 10/1977 | Chang | 350/358 |
| 4,126,834 | 11/1978 | Coppock | 350/358 |
| 4,505,550 | 3/1985 | Steinbruegge | 350/372 |

Primary Examiner—Bruce Y. Arnold
Attorney, Agent, or Firm—Thomas R. Tremaus

[57] ABSTRACT

The invention is directed to an acousto-optic dispersive light analyzer (AODLF) which is an electronically adjustable spectroscopic device capable of instantaneously monitoring many wavelengths with a fixed drive frequency. The AODLF has about a one octave range, whose center is selected by changing the RF. The resolution of the AODLF in the infrared is several thousand, and it is electronically adjustable. The acousto-optic device according to this invention is particularly useful for the detection and analysis of short light pulses. An additional capability of the AODLF is its operation in a derivative mode for enhanced SNR of coherence detection in the presence of a high incoherent background by imposing a very small frequency modulation on the RF applied to the AODLF. Then by phase locking each of the detector element signals at first the fundamental and then the first harmonic of the FM, the first and second spectrum derivatives of each resolution element can be observed.

5 Claims, 7 Drawing Figures

ACOUSTO-OPTIC DISPERSIVE LIGHT FILTER

This is a division of application Ser. No. 06/666,416, filed Oct. 30, 1984.

BACKGROUND OF THE INVENTION

The invention is directed to a method for instantaneously monitoring two or more wavelengths of light and an apparatus for effecting the same. More particularly, the invention is an acousto-optic dispersive light filter (AODLF), which is an electronically adjustable spectroscopic device capable of instantaneously monitoring many wavelengths with a fixed drive frequency. The present invention has approximately a one octave optical range, the center of which is selected by changing the RF. The resolution of the AODLF in the infrared is several thousand, and is also electronically adjustable. The process and apparatus of this invention is particularly useful for the detection and analysis of, for example, short light pulses.

The acousto-optic tunable filter (AOTF) has long been recognized as an effective way to rapidly analyze light with an all solid-state device, over a large spectral bandwidth. Among the advantages of the AOTF are its large angular aperture with good spectral resolution, making it well suited for applications both in the visible and infrared ranges. However, the AOTF is inherently a single-channel device; i.e., in its natural mode of operation, only one wavelength resolution element at a time may be passed, although it is possible to randomly access such elements in times typically on the order of tens of microseconds. This random access time is simply limited by the travel time of the acoustic wave across the optical aperture. Thus, the filtered light falls open a single detector element, and the spectrum scanning is performed by a linear time sweep of the applied RF power. A typical application of an AOTF as described above is set forth in detail in allowed U.S. patent application Ser. No. 345,123 filed Feb. 2, 1982 now U.S. Pat. No. 4,490,845 and entitled "An Automated Acousto-Optic Infrared Analyzer". This allowed patent application is assigned to the assignee of the subject patent and is incorporated by reference as if set forth in full herein. Such a spectrum scanning operation is satisfactory in the presence of cw or very slowly varying light signals, in which the composition of the light remains essentially constant over a complete sweep duration of the RF range. Complications, however, may arise in the presence of pulsed-light signals, which will go undetected unless the proper acoustic tuning frequency is present in the optical aperture at the instant of the light pulse. Thus, if it is desired to detect the presence of a known optical wavelength, but at an unknown time of arrival, the AOTF must be continuously excited with RF of exactly that frequency. This may be extended to a few wavelengths simultaneously, for which frequencies corresponding to each of the wavelengths must be simultaneously applied to the AOTF. In this case, the determination of which of the several wavelengths may have been detected will require a strategy of frequency dropping over a few pulses. Operation at reduced duty cycle will result in lower detection probability. These difficulties make it desirable to consider possible acousto-optic techniques which are many channel in nature, so that the device will be open to receive all of the wavelength resolution elements simultaneously.

It is, therefore, an object of this invention to provide an acousto-optic dispersive light analyzer which is an electronically adjustable spectroscopic device capable of instantaneously monitoring many wavelengths with a fixed drive frequency and a technique for operating such an acousto-optic device to obtain the aforedescribed results.

It is also an object of this invention to provide an acousto-optic dispersive light filter for operation in a derivative mode.

The AODLF is functionally very similar to a fixed grating, but there are several important differences which are advantageous in certain applications. The two principal differences are the tunability of the AODLF and its birefringent operation. A conventional grating, being optically isotropic (i.e., no change of polarization of the diffracted light), must be blazed in order to concentrate the diffracted light into a single order; however, the birefringence of the AODLF produces only a single order. Because the fixed grating is isotropic, the angular aperture with a blaze will be more limited than the angular aperture of the AODLF and correspondingly the optical range will also be more limited. A large change in the optical bandcenter of the fixed grating requires a mechanical change in the angle of incidence, while a bandcenter change of the AODLF is accomplished simply by a change in the RF only, with no change in the angle of incidence. Thus, the unique feature which is provided by the AODLF of this invention is the electronic tunability of the grating constant, which allows enhanced flexibility of operation, such as large changes of spectral range. The electronic tunability also easily permits the frequency modulation of the optical signal in order to perform derivative spectroscopy, which may improve the signal-to-noise ratio over that of a constant signal.

It is known that the simplest AO Bragg diffraction of the type used in scanning and deflection can be employed, in principle, to effect a light spectrum analyzer. However, there are serious limitations to this simplistic approach. Ideally, such a device would work in the following fashion. The light to be analyzed is incident on the cell at some fixed angle which will not be varied over the entire spectral range, and with some usably large angular aperture; the acousto-optic cell will be excited with a fixed cw RF so that there will be unity probability of intercept, and at as near 100% efficiency as possible for maximum sensitivity; each wavelength resolution element should emerge from the cell at a different diffracted angle, so that a detector array in the focal plane of the system may be used to analyze the light spatially; the spectral range and the resolution should be electronically controllable so that no mechanical motion is needed to make adjustments for its operation.

In the simplest configuration, the low frequency or Raman-Nath mode of diffraction, the relationship between the optical wavelength, $\lambda$, the acoustic wavelength, $\Lambda = v/f$, and the interaction length, $l$, must satisfy $$4l\lambda/\Lambda^2 = Q << l \tag{1}$$

where $v$ is the acoustic wave velocity and $f$ its frequency. When this condition is satisfied, for light incident normal to the acoustic wave propagation direction, light is diffracted at the Bragg angle $\theta_B$ into multiple positive and negative orders, n, according to $$\sin n\theta_B = n\lambda/\Lambda = n\lambda f/v \qquad (2)$$

The resolution of the cell is simply given by N, the number of acoustic wavelengths within the optical aperture, L, so that $$N = L/\Lambda = Lf/v \qquad (3)$$

and the angular aperture, A, is given by the acoustic wave diffraction spread $$A = \Lambda/l = \lambda/l \sin\theta_B \qquad (4)$$

A few characteristics can be easily evaluated for the two favorable infrared materials, $Tl_3AsS_3$ (TAS) and $Hg_2Cl_2$, at an optical wavelength of, say, 5 μm. To satisfy the condition of Q<1 we take l=1 cm for TAS, and 0.5 cm for $Hg_2Cl_2$, and an RF of 2.3 MHz for the former and 1.1 MHz for the latter. At such low frequencies, acoustic attenuation is not a limiting factor, and we may make the optical aperture crystal size limited, say 5 cm. The number of resolution elements will then be 110 for TAS and 158 for $Hg_2Cl_2$. These characteristics are summarized in Table I.

TABLE I

CHARACTERISTICS OF RAMAN-NATH
AO DISPERSION CELL
$\lambda = 5$ μm, L = 5 cm

| Material | l(Cm) | f(MHz) | $\theta_B$(deg) | A(deg) | N |
|---|---|---|---|---|---|
| TAS | 1 | 2.3 | 0.63 | 2.6 | 110 |
| $Hg_2Cl_2$ | 0.5 | 1.1 | 0.91 | 3.6 | 158 |

There are some serious limitations on utilizing Raman-Nath diffraction in this fashion for optical spectrum analysis. First, since the interaction length l, must be small, it will not be possible for the efficiency to be high at long infrared wavelengths. This is because the RF power requirements increase with the square of the wavelength, and the above values of l will not be large enough even with these efficient materials; compounding this difficulty is the wasting of diffracted light to orders other than the +1, so that the detected light efficiency at a single order can never be high. Second, the presence of multiple diffraction orders restricts the optical bandwidth to one octave, in order that there be no overlap between first and second orders. Third, the Bragg angles are small in comparison with the angular aperture, so that it will be necessary that the input light be highly collimated.

One might hope to avoid these difficulties by operating in the Bragg diffraction mode, for which it is required that the parameter Q>>1. To illustrate the problems this approach leads to, let us assume a factor of 10 increase in RF, for the same values of l. Operation in the Bragg regime requires that the light to be analyzed be incident to the acoustic wave at the Bragg angle, so that the incident light angle must therefore vary with the optical wavelength. If we require the incident light angle to be fixed, the spectral range will be limited by the angular aperture. Some of these considerations are summarized in Table II.

TABLE II

CHARACTERISTICS OF BRAGG AO DISPERSION CELL
$\lambda = 5$ μm, L = 1 cm

| Material | l(Cm) | f(MHz) | A(deg) | Spectral Range(μm) | N |
|---|---|---|---|---|---|
| TAS | 1 | 23 | 0.26 | 0.21 | 220 |
| $Hg_2Cl_2$ | 0.5 | 11 | 0.36 | 0.20 | 316 |

It is apparent that this approach is unsatisfactory due to the very small value of spectral range that results from the small angular aperture. The range can be enlarged by mechanical rotation of the cell to match the Bragg angle as the optical wavelength is changed, but then the device is no longer purely electronic.

The acousto-optic tunable filter (AOTF) which is known generally consists of a transducer plate and a transparent optical medium through which acoustic waves generated by the transducer propagate. The transducer is typically a thin plate of a piezoelectric crystal such as lithium niobate ($LiNbO_3$) or quartz ($SiO_2$). The optical medium must be crystalline and possess the appropriate symmetry properties, such as thallium arsenic selenide ($Tl_3AsSe_3$). The transducer is operably associated with the optical medium by a bond of high acoustic quality. The operational concept of the AOTF is explained in detail in the article "Tunable Acousto-Optic Filters and Their Application to Spectroscopy", Feichtner, J. D., et al., SPIE Vol. 82, page 106 (1976), the contents of which are incorporated herein by reference.

BRIEF DESCRIPTION OF THE DRAWINGS

The above, as well as other features and advantages of the present invention, will become apparent through consideration of the detailed description in connection with the accompanying drawings in which.

SUMMARY OF THE INVENTION

The invention is an acousto optic dispersive light filter (AODLF) for operation in a derivative mode. The AODLF is an optically birefringent crystal with an input face at a predetermined angle which is normal to the incident light. A transducer is accoustically coupled to a side of the crystal and launches acoustic waves into the crystal at a predetermined radio frequency. Output light detecting means include one or more detector elements and also means for phase locking the output signal(s) of the detector elements at the fundamental and then first harmonic of the frequency modulation applied to the radio frequency excitation.

DETAILED DESCRIPTION OF THE INVENTION

Figure 3B:
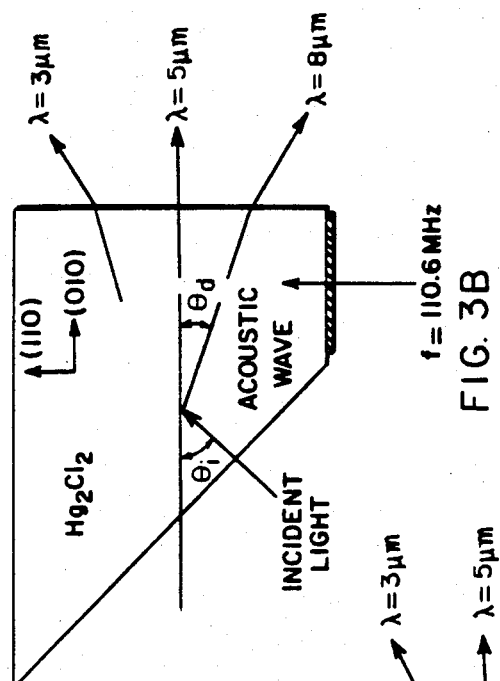
FIGS. 3A and 3B illustrate schematically configurations for a TAS crystal and a mercurous chloride crystal AODLF, respectively.
Figure 3A:
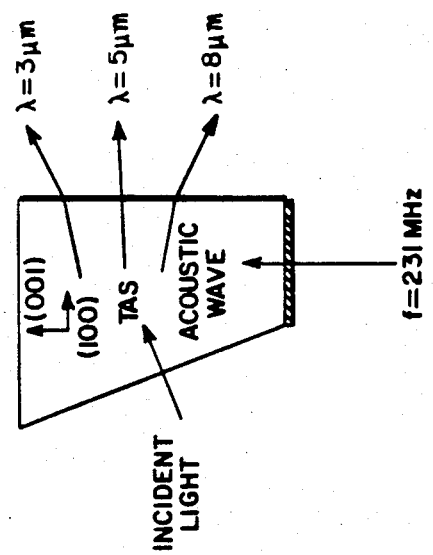

All of the limitations encountered with the isotropic configurations described above can be reasonably well overcome by utilizing the anisotropic Bragg diffraction mode, which exploits the crystal birefringence. In this mode, the incident light must be polarized (ordinary or extraordinary), and the diffracted light will be orthogonally polarized. The anisotropic mode is used extensively for wideband scanners for signal processing, the tellurium dioxide scanner being the most prominent example. The key feature of this mode is that a some fixed value of RF (dependent upon the crustal's refractive indices, acoustic velocity, and the light wavelength), there is a minimum in the incident Bragg angle with frequency, while the diffracted Bragg angle increases linearly with frequency. We shall see that we may use this mode for light spectrum analysis because there is a similar behavior with optical wavelength as the frequency is held constant. The well-known equations for the anisotropic Bragg angles of incidence and diffraction are:

$$\sin \theta_i = \frac{1}{2n_i} \frac{\lambda f}{v} \left[ 1 + \left(\frac{v}{\lambda f}\right)^2 (n_i^2 - n_d^2) \right] \quad (5)$$

and $$\sin \theta_d = \frac{1}{2n_d} \frac{\lambda f}{v} \left[ 1 - \left(\frac{v}{\lambda f}\right)^2 (n_i^2 - n_d^2) \right] \quad (6)$$

where $n_i$ and $n_d$ are the refractive indices corresponding to the incident and diffracted light, and $\theta_i$ and $\theta_d$ are measured with respect to the acoustic wave fronts, as shown in FIG. 3. Differentiating $\theta_i$ with respect to the optical wavelength results in:

$$d\theta_i/d\lambda = \frac{f}{2n_i \cos \theta_i v} - \frac{v}{2 \cos \theta_i v f} \frac{n_i^2 - n_d^2}{n_i} \quad (7)$$

from which it is seen that there is a minimum value of $\theta_i$ as the optical wavelength is varied. The wavelength at which the minimum occurs can be chosen by choosing the value of RF according to:

$$f_c = (v/\lambda) \sqrt{n_i^2 - n_d^2} \quad (8)$$

The significance of operation near this minimum value of $\theta_i$ is that there will be little sensitivity to error in $\theta_i$ about this point as the optical wavelength varies. The angle of diffracted light will, however, vary almost linearly with wavelength. Another important feature to observe from these equations is the electronic tunability of the center wavelength; the optical bandcenter (i.e., location of minimum $\theta_i$) is determined by the RF according to Equation (8). Furthermore, it can be seen from Equation (5) that as the values of RF and optical wavelength center vary with Equation (8), the value of $\theta_i$ does not change. Thus, we can electronically change the bandcenter of the light analyzer, and no mechanical adjustment need be made to change $\theta_i$. There will be only a negligible change at different wavelengths due to the small change in the refractive indices with wavelength.

Figure 1:
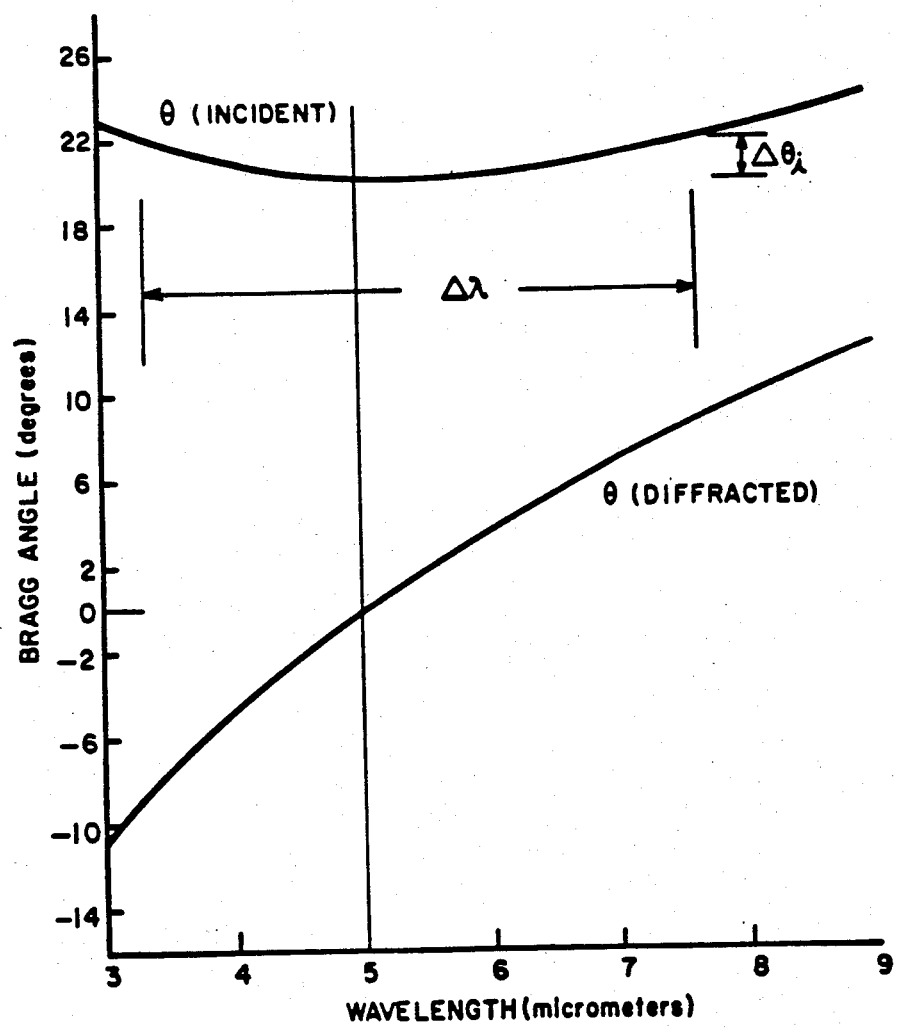
FIG. 1 is a graph demonstrating the wavelength dependence of anisotropic Bragg angles for a thallium arsenic selenide crystal AODLF operated at a frequency of 231 MHz.
Figure 2:
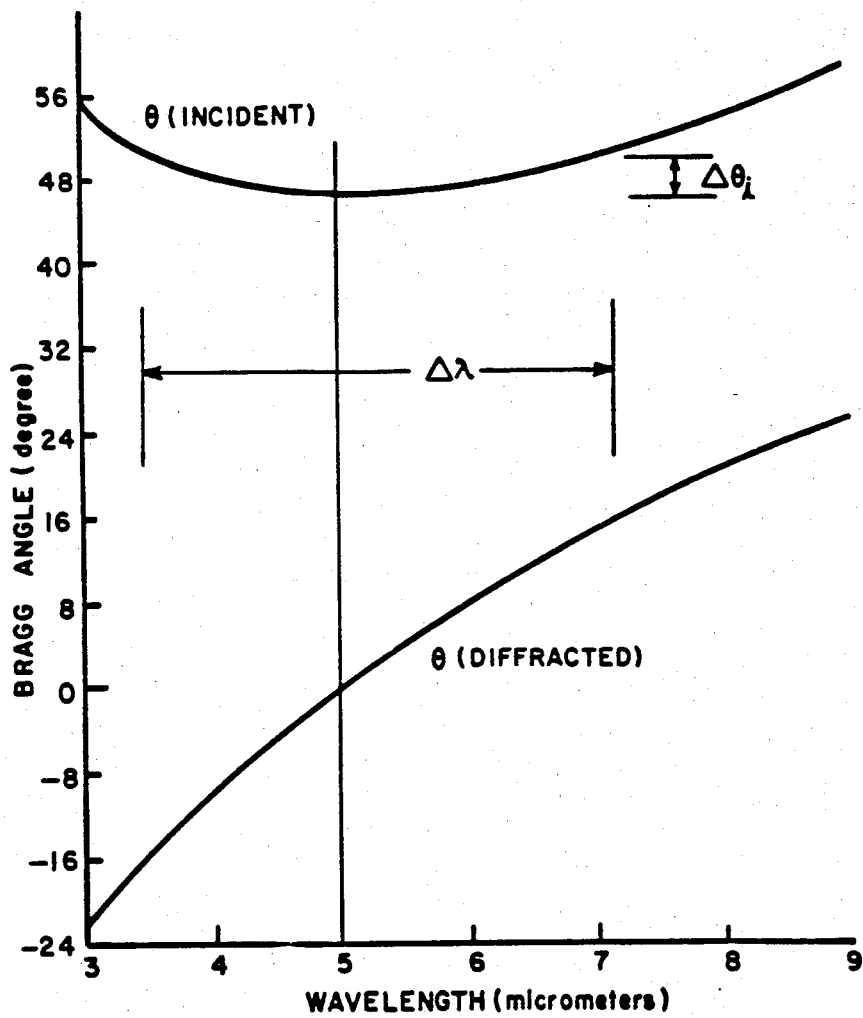
FIG. 2 is a graph demonstrating the wavelength dependence of anisotropic Bragg angles for a mercurous chloride crystal AODLF operated at a frequency of 110.6 MHz.

In order to quantify this concept we may use TAS and $Hg_2Cl_2$ for numerical examples. As a typical case, we choose 5 $\mu$m as the center wavelength of the analyzer, and take 2 cm as the size of the optical aperture. The value calculated for the RF is f=231 MHz for TAS, and f=110.6 MHz for $Hg_2Cl$. Plots of the angles of incidence and diffraction vs. wavelength are shown in FIGS. 1 and 2 for these two materials. For TAS, the internal angle of incidence is 20 degrees with a variation of 2 degrees in the wavelength range from 3.4 $\mu$m to 7.6 $\mu$m; the internal angle of diffracted light varies over 18 degrees. For $Hg_2Cl_2$, the angle of light incidence is 45 degrees, with a 2-degree variation between 3.5 $\mu$m and 7.2 $\mu$m, while the angle of diffracted light varies over 32 degrees. The resolution of the device will simply be given by the number of acoustic wavelengths within the optical aperture; if we assume a 2 cm aperture, then for TAS, N=4400, and for $Hg_2Cl_2$, N=6300. This is far greater than the resolution that can be achieved at infrared wavelengths using the noncollinear AOTF. The incident and diffracted light angles are large, and the optical faces should be cut so that the incident and diffracted light beams are normal to these faces. A schematic of the crystal with the faces cut to conform to these angles in FIG. 3, and a summary of the AODLF characteristics is given in Table III.

TABLE III
CHARACTERISTICS OF AODLF
$\lambda = 5 \mu m$, L = 2 cm

| Material | f(MHz) | $\theta_i$(degrees) | Spectral Range($\mu$m) | N |
|---|---|---|---|---|
| TAS | 231 | 20 | 3.4–7.6 | 4400 |
| $Hg_2Cl_2$ | 110.6 | 45 | 3.5–7.2 | 6300 |

Figure 4:
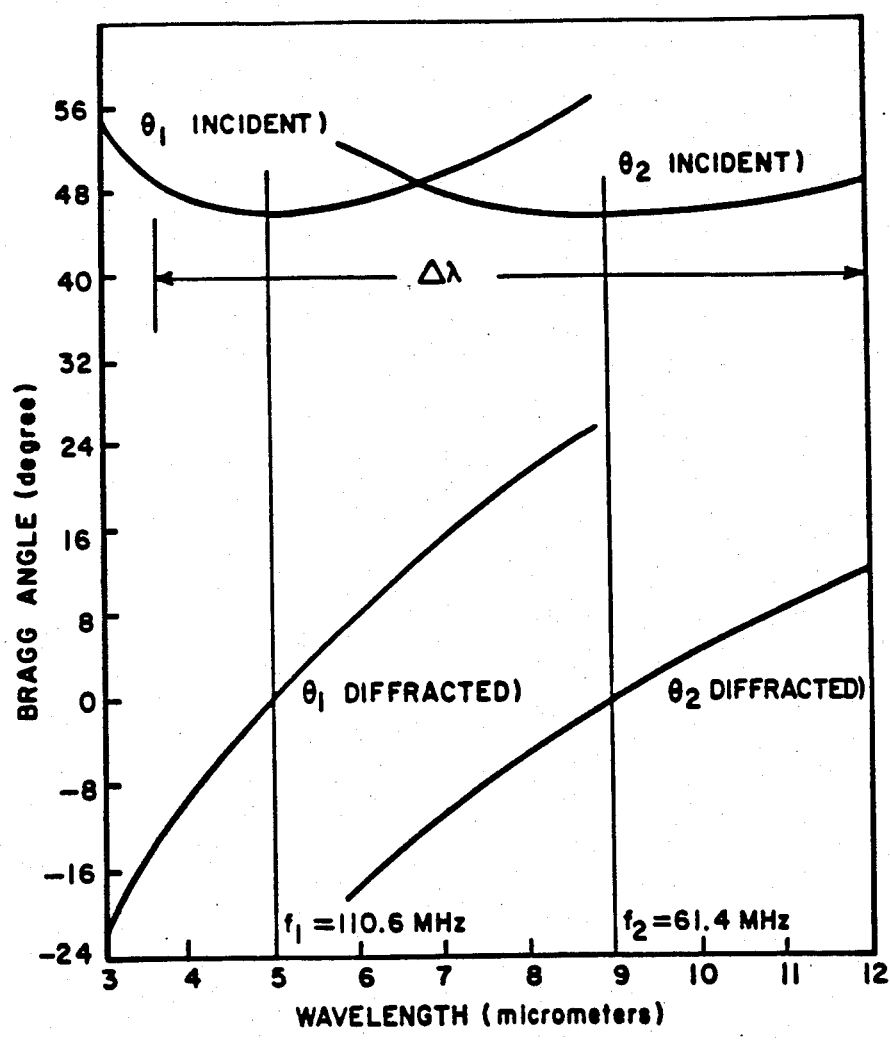
FIG. 4 is a graph illustrating the Bragg angles for two-frequency operation of a mercurous chloride AODLF.

The two designs illustrated by the examples shown in FIGS. 1 and 2 have spectral bandwidths of about one octave, which will probably for typical for this device. We may consider ways of extending the bandwidth with multiple frequency operation. For example, suppose the $Hg_2Cl_2$ cell is excited with RF at 110.6 MHz to yield a bandcenter at 5 $\mu$m, and also at 61.4 MHz to yield a bandcenter at 9 $\mu$m. The Bragg angles for both are shown in FIG. 4 for the spectral range between 3 $\mu$m and 12 $\mu$m, a bandwidth of about 2 octaves. The complication this gives rise to is that there are two possible optical wavelengths wavelengths corresponding to each diffracted angle, and some coding scheme would have to be used to distinguish between the two. The simplest would be a time multiplex between the two frequencies, but this would entail a reduced probability of intercept. Other coding schemes can be envisioned, and these will have to be explored as the concept is developed.

Figure 5:
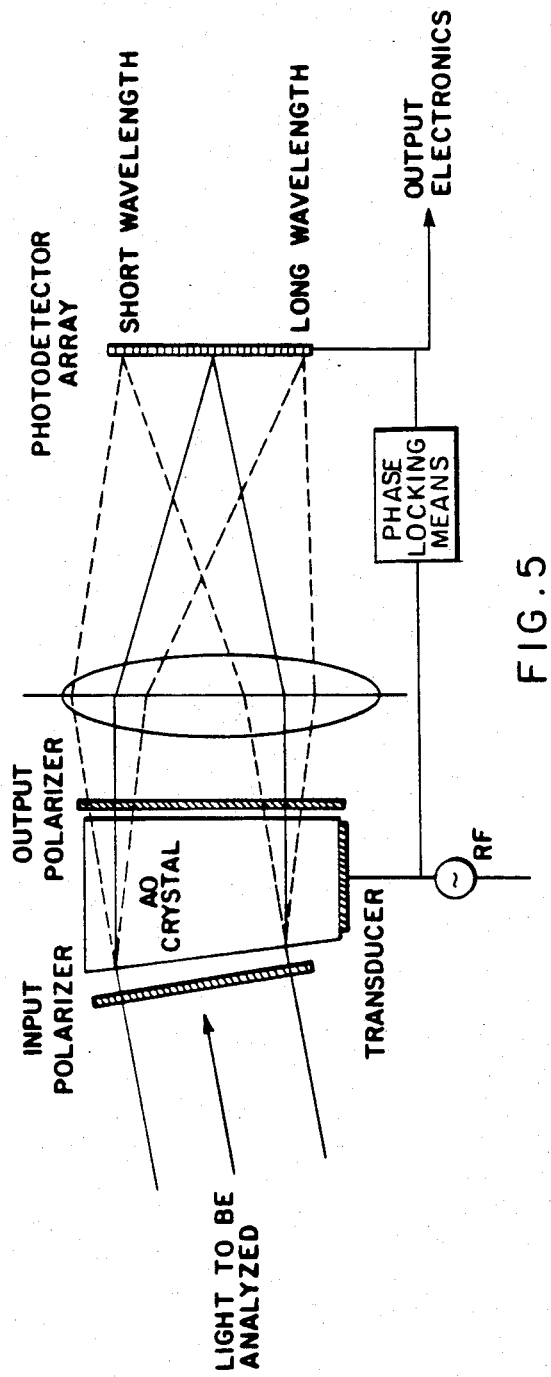
FIG. 5 is a schematic representation of an electronically adjustable spectroscopic system all according to the teachings of this invention.
Figure 6:
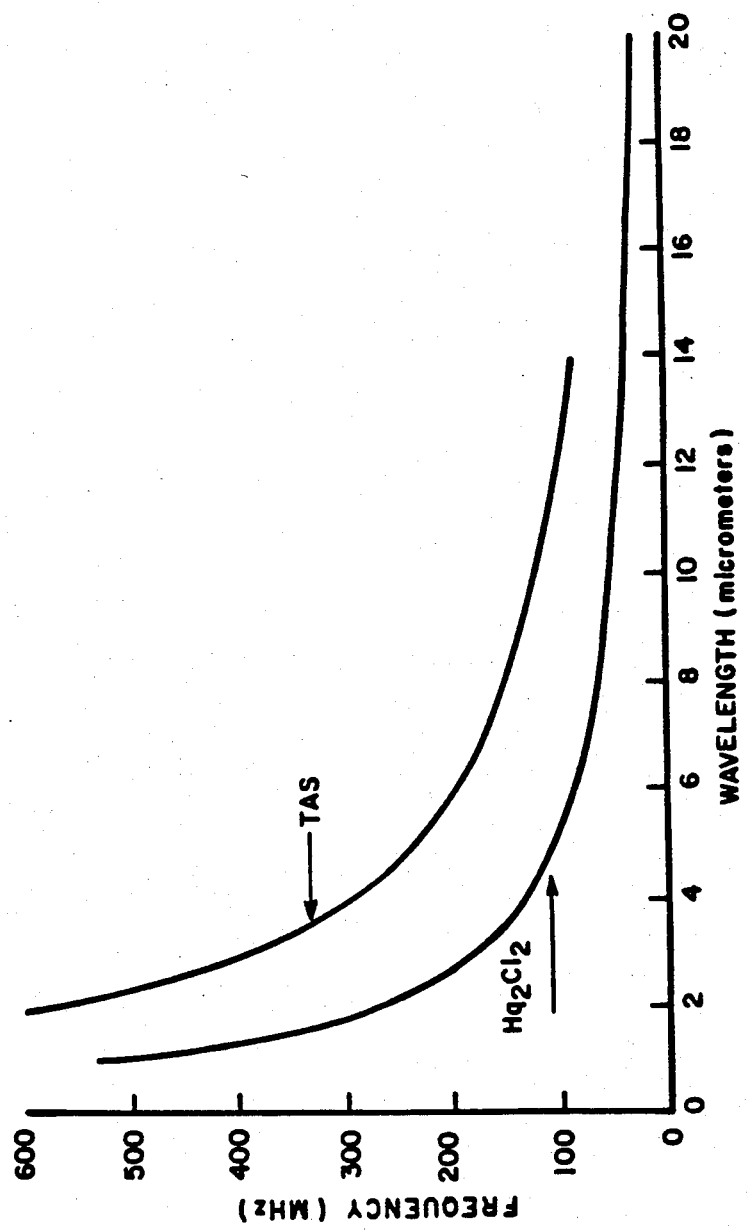
FIG. 6 is a graph illustrating the optical bandcenter tuning relation for both a TAS (thallium arsenic selenide) crystal AODLF and a mercurous chloride AODLF.

A schematic of a representative spectrum analyzer system using the AODLF is shown in FIG. 5. This includes input and output polarizers, focusing lens, and photo-detector array to provide the readout.

By incorporating a two-dimensional detector array, spectral imaging may be done, in which one dimension contains the spatial information, and the other dimension contains the spectral information of a line-scanned image. An additional capability of the AODLF that will be useful for satellite based information processing system applications will be its operation in a derivative mode for enhanced SNR of coherence detection in the presence of high incoherent background. This is simply done by imposing a very small frequency modulation on the RF applied to the AODLF. Then by phase locking each of the detector element signals at the fundamental and then first harmonic of the FM, we observe the first and second spectrum derivatives of each resolution element. The great advantage over the AOTF is that the entire spectral range is under continuous monitoring.

Operating the AODLF in the derivative mode brings to light another feature of this device which may be functionally useful. By imposing an FM signal onto the cw wave which excites the cell, there will instrantaneously be a band of acoustic frequencies, $\Delta f$, present in the aperture at all times. Therefore, the wavelength purity of each angular resolution element will be degraded; the wavelength spread of each element will be determined by the differential of Equation (8), $$\Delta \lambda = \frac{v}{f_2} \sqrt{n_i^2 - n_d^2} \, \Delta f \quad (9)$$

The reduction in resolution can be expressed as the ratio of this "FM spread" resolution to the maximum cw resolution, $\delta \lambda = v/Lf$, $$\frac{\Delta \lambda}{\delta \lambda} = \sqrt{\frac{n_i^2 - n_d^2}{f \lambda} L} \, \Delta f \quad (10)$$

Obviously, the greater the cw resolution (i.e., the larger L), the greater will be the reduction in resolution for a given FM spread. Using the parameters from Table III to evaluate a typical example, we find that for TAS the resolution reduction ratio is:

$$\frac{\Delta \lambda}{\delta \lambda} = 1.9 \times 10^{-5} \Delta f = 19/\text{MHz} \quad (11)$$

while for $Hg_2Cl_2$ this ratio is $$\frac{\Delta \lambda}{\delta \lambda} = 5.3 \times 10^{-5} \Delta f = 53/\text{MHz}. \quad (12)$$

Thus, by varying the amplitude of the FM signal applied to the RF, we may reduce the resolution of the AODLF, as observed in the direct signal from the photo-detector array.

What has been described is an acousto-optic dispersive light filter in which the light to be analyzed is incident on the cell at some fixed angle which will not be varied over the entire spectral range and with a usably large angular aperture. Moreover, the acousto-optic cell will be excited with a fixed RF so that there will be unity probability of detection of the light component of interest, and as near 100% efficiency as possible for maximum sensitivity. Also, each wavelength resolution element will emerge from the cell at a different diffracted angle in one dimension, and each angular resolution element will emerge from the cell at a different refracted angle normal to the diffracted angle, so that a 2-dimensional area detector array in the focal plane of the system can be used to analyze the light both spectrally and spatially. The spectral range and the resolution are electronically controllable so that no mechanical motion is needed to make adjustments for its operation.

What is claimed is:

1. An acousto-optic dispersive light filter for operation in a derivative mode comprising:
   an optically birefringent crystal having an optical input face, and optical output face and a pair of opposed sides, said optical input face being disposed at a predetermined angle which is normal to the incident light;
   means acoustically coupled with one of said opposed sides for launching acoustic waves into said crystal at a predetermined frequency;
   means for applying a frequency modulated RF excitation to the means acoustically coupled to said crystal;
   means for detecting output light from said crystal, which detecting means includes one or more detector elements which provides an output signal indication of detected output light, and including means for phase locking the output signal of each of said one or more detector elements at the fundamental and then first harmonic of the frequency modulation applied to the RF excitation, wherein first and second spectrum derivatives of each resolution element can be observed.

2. The acousto-optic disperser light filter according to claim 1 wherein the crystal is a $Tl_3AsSe_3$ crystal.

3. The acousto-optic disperser light filter according to claim 1 wherein the crystal is a $Hg_2Cl_2$ crystal.

4. The acousto-optic disperser light filter according to claim 1 including polarizers disposed proximate the input and output faces of the crystal.

5. A method of operating an acousto-optic dispersive light filter in a derivative mode comprising the steps of:
   directing the light to be analyzed through an optically birefringent crystal having an optical input face, and optical output face and a pair of opposed sides, wherein said light to be monitored is incident in one polarization and at a predetermined fixed angle over its entire spectral range to said optical input face, which optical face is normal to the incident light and wherein one of said opposed sides has means acoustically coupled therewith for launching acoustic waves into said crystal;
   launching acoustic waves into said crystal by the frequency modulation of an RF excitation applied to said means acoustically coupled to said crystal for launching acoustic waves thereinto;
   directing the light from the output face onto a detection means having one or more detector elements thereon; and
   phase locking an output signal of each of said one or more detector elements at the fundamental and then first harmonic of the frequency modulation applied to the RF excitation, wherein first and second spectrum derivatives of each resolution element can be observed.

* * * * *